United States Patent [19]
Moll

[11] Patent Number: 4,807,435
[45] Date of Patent: Feb. 28, 1989

[54] AIR-BREATHING JET ENGINE

[75] Inventor: Manfred Moll, Duesseldorf, Fed. Rep. of Germany

[73] Assignee: Rheinmetall, GmbH, Duesseldorf, Fed. Rep. of Germany

[21] Appl. No.: 59,149

[22] Filed: Jun. 5, 1987

Related U.S. Application Data

[63] Continuation of Ser. No. 822,888, Jan. 27, 1986, abandoned.

[30] Foreign Application Priority Data

Jan. 26, 1985 [DE] Fed. Rep. of Germany ....... 3502673

[51] Int. Cl.$^4$ .......................... F02K 9/28; F02K 9/00
[52] U.S. Cl. ........................................ 60/253; 60/245; 60/270.1
[58] Field of Search .................. 60/270.1, 251, 253, 60/245; 239/265.19, 434.5

[56] References Cited

U.S. PATENT DOCUMENTS

| | | |
|---|---|---|
| 2,999,672 | 9/1961 | Harshman . |
| 3,044,255 | 7/1962 | Precoul ............................ 60/253 |
| 3,221,497 | 6/1962 | Forbes . |
| 3,514,956 | 6/1970 | Bray ............................... 60/270.1 |
| 3,535,881 | 10/1970 | Schubert ......................... 60/251 |
| 3,807,169 | 4/1974 | Bradford ......................... 60/270.1 |
| 4,063,415 | 12/1977 | Rhoades . |
| 4,483,139 | 11/1984 | Engl ............................... 60/251 |

FOREIGN PATENT DOCUMENTS

| | | |
|---|---|---|
| 2459001 | 6/1976 | Fed. Rep. of Germany . |
| 3104680 | 2/1981 | Fed. Rep. of Germany . |
| 113032 | 9/1981 | Japan ................................. 60/251 |

Primary Examiner—Louis J. Casaregola
Assistant Examiner—Timothy S. Thorpe
Attorney, Agent, or Firm—Klein & Vibber

[57] ABSTRACT

A rocket engine according to the invention has a body generally extending along an axis and adapted to move through the air in a predetermined axial back-to-front direction. This body is formed with axially spaced front and rear fuel-containing combustion chambers. A nozzle centered on the axis and extending axially backward in the body from the front chamber has a rear nozzle end directed axially backward so that gases generated in the front chamber by combustion of the fuel therein form a fan-shaped jet extending axially backward from the rear nozzle end. The injector of this invention comprises a front tube centered on the axis, having an upstream end sealed to the nozzle upstream of the rear nozzle end, and having a rear downstream end formed with an outside bevel and located axially downstream of the jet formed by the nozzle, and a rear tube secured to and coaxial with the front tube, radially surrounding same and forming therewith an annular gap open axially upstream, and having an upstream end formed with a bevel and positioned axially forward of the rear nozzle end. A diffuser is provided in or on the body for deflecting outside air axially back into the gap.

13 Claims, 2 Drawing Sheets

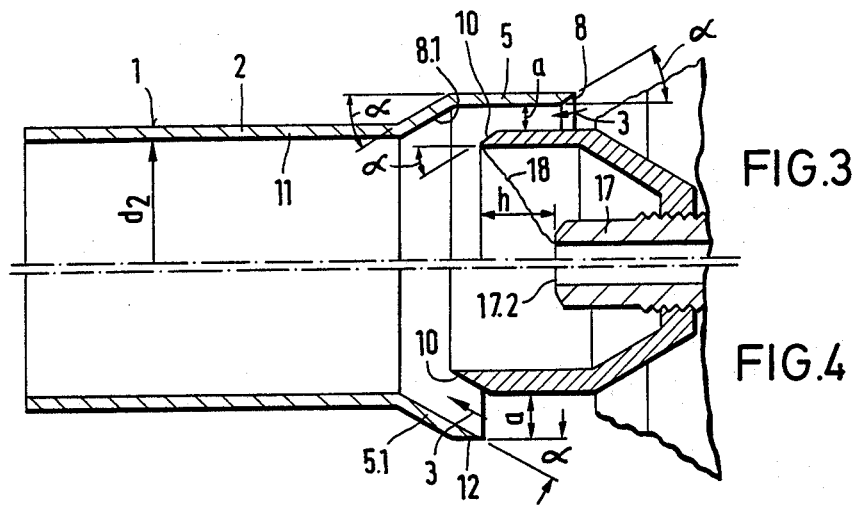
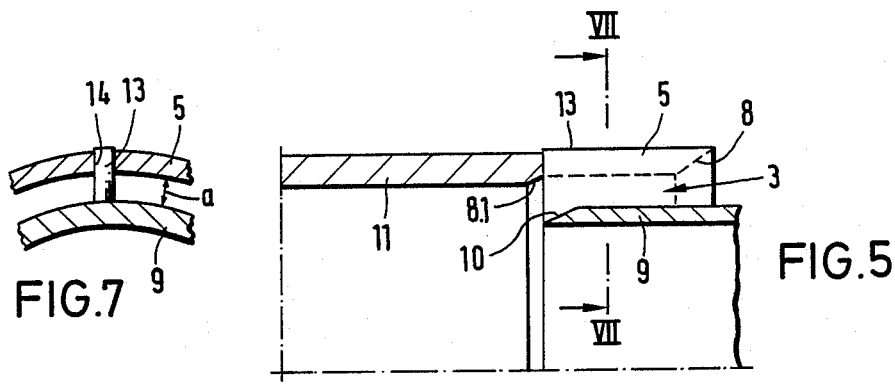
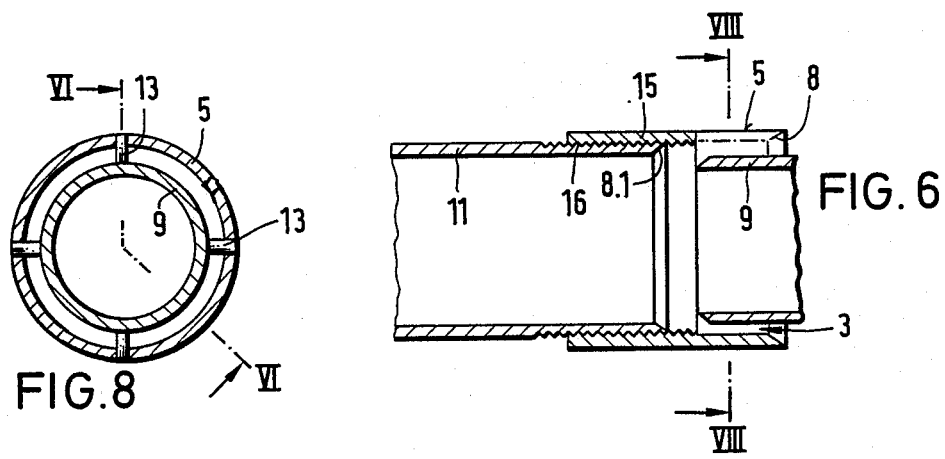

an optimal combustion stoichiometry can be obtained with the outside air, for a very efficient combustion, even of a fuel containing aluminum as an additive.

AIR-BREATHING JET ENGINE

This application is a continuation of U.S. Ser. No. 822,888, filed 1/27/86, now abandoned.

FIELD OF THE INVENTION

The present invention relates to a rocket. More particularly this invention concerns a two-stage air-breathing jet drive or engine for a rocket.

BACKGROUND OF THE INVENTION

A standard two-stage air-breathing drive for a rocket comprises a front combustion chamber in which fuel is burnt to produce combustible gases that exit this chamber via a small-diameter nozzle. A diffuser captures air and mixes it with the gases exiting the nozzle in a second combustion chamber where more fuel is burnt, creating substantial expansion that produces thrust out the rear end of the rocket. The fuel used is usually solid and lines the combustion chambers.

In a typical such system as described in German patent document No. 3,104,680 filed by S. Notake et al with a claim to a Japanese priority date of Feb. 12, 1980, the nozzle is provided with an injector in the rear combustion chamber. This injector has radially throughgoing holes aligned with radially inwardly open vents in the cowling of the rocket so that air trapped by the cowling is forced radially into the injector to mix with the gases exiting the front combustion chamber via the nozzle.

In such an arrangement the mixing of the aspirated air with the gases from the front chamber is poor, as the gases emitted by the nozzle are moving at high ultrasonic speeds. Thus such an arrangement is not efficient when using a metal-containing solid fuel, in particular one containing aluminum, as the stoichiometry is incorrect. In this system the mass-flow ratio of air (from outside the rocket) to gas (generated in the front chamber) is therefore about 30:1, or about eight times what the stoichiometry of the reaction would require, so that there is a substantial possibility of the flame going out when such metallic additives are used. At best the efficiency of the combustion is low.

Furthermore when such a nozzle is used it is inadvisable to use a fuel containing a metallic additive, as the metallic particles can condense and plate out in the nozzle. This can result in plugging of the nozzle and complete failure of the jet drive. Furthermore, deflecting the axially arriving additive air radially into the injector means that some of the energy of this air stream is lost.

OBJECTS OF THE INVENTION

It is therefore an object of the present invention to provide an improved jet drive for a rocket or the like.

Another object is the provision of such a jet drive for a rocket or the like which overcomes the above-given disadvantages, that is which has very efficient combustion even when using a solid fuel containing a metallic additive in the front combustion chamber.

SUMMARY OF THE INVENTION

A rocket engine according to the invention has a body generally extending along an axis and adapted to move through the air in a predetermined axial back-to-front direction. This body is formed with axially spaced front and rear fuel-containing combustion chambers. A nozzle centered on the axis and extending axially backward in the body from the front chamber has a rear nozzle end directed axially backward so that gases generated in the front chamber by combustion of the fuel therein form a fan-shaped jet extending axially backward from the rear nozzle end. The injector of this invention comprises a front tube centered on the axis, having an upstream end sealed to the nozzle upstream of the rear nozzle end, and having a rear downstream end formed with an outside bevel and located axially downstream of the jet formed by the nozzle, and a rear tube secured to and coaxial with the front tube, radially surrounding same and forming therewith an annular gap open axially upstream, and having an upstream end formed with a bevel and positioned axially forward of the rear nozzle end. A diffuser is provided in or on the body for deflecting outside air axially back into the gap.

It is therefore possible to tailor the mixture of air and generator gas to the exact stoichiometric requirements of the reaction. Even when an aluminum-containing additive is used it is possible according to this invention to achieve complete and rapid combustion at high temperatures. In addition the injector can be made fairly compact, and does not in any way waste the energy of the incoming additive air by deflecting it radially. The mixing of the incoming air and the generator gas is complete even without the prior-art radial deflection due to the annular flow of the incoming air. The combustion temperature can be held, in particular with an aluminum solid-fuel additive, well above 2300° K. so that very high thrust is produced.

Using a Laval-type nozzle that causes the generator gases to expand at ultrasonic speeds in a conical fan shape prevents any of the metal particles in the generator gas from condensing and eliminates the possibility of the nozzle plugging up. The axial length of the injector is largely a function of the particle size of the metallic additives and can be very short, so that the secondary combustion in the following combustion chamber can be similarly efficient.

According to another feature of this invention the rear tube is cylindrical and the front tube includes an annular rear part and a frustoconical front part secured to the nozzle. It is also possible for the rear tube to include a cylindrical front part forming the front end, a cylindrical rear part of the same general diameter as the front tube and axially therebehind, and a frustoconical intermediate part joining the front and rear parts. Normally the bevels according to this invention extend at an angle of between 3° and 45° to the axis. In this manner some compression of the incoming air is achieved with extremely even flow and minimal turbulence.

In accordance with a further feature of the invention the rear tube has a frustoconical front part extending generally parallel to the outside bevel of the rear nozzle end and a cylindrical rear part joined to the front part and of generally the same diameter as the front tube. A plurality of radial struts fixedly bridging the gap and fixedly interconnect the front and rear tubes, to which end the rear tube is formed with slots in which the struts are seated.

The rear tube according to another invention feature is generally cylindrical and has a front part formed with a large-diameter cylindrical inner surface, a rear part formed with a small-diameter cylindrical inner surface, and a frustoconical intermediate part interconnecting the front and rear parts. The front, rear, and intermediate parts of the rear tube can be unitary or the front part can be threaded on the rear and intermediate parts.

The tubes according to the invention and the struts are of a metal having a melting point above 2500° K. Normally they are made of tungsten, of molybdenum, or of an alloy of tungsten and molybdenum. It is possible by using tungsten to increase the melting point of the injector to 3600° K.

DESCRIPTION OF THE DRAWING

The above and other features and advantages will become more readily apparent from the following, it being understood that any feature described with reference to one embodiment of the invention can be used where possible with any other embodiment. In the accompanying drawing:

FIGS. 3, 4, and 5 are axial sections through second, third, and fourth embodiments of this invention;

FIG. 6 is an axial section through a variant on the FIG. 5 embodiment; and

FIGS. 7 and 8 are sections taken respectively along lines VII—VII and VIII—VIII of FIGS. 5 and 6, and line VI—VI in FIG. 8 indicates the folded section plane of FIG. 6.

SPECIFIC DESCRIPTION

Figure 1:
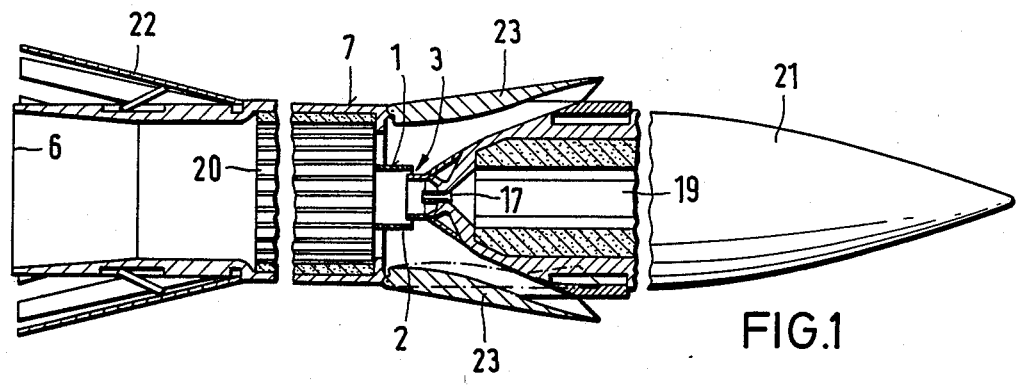
FIG. 1 is a small-scale axial section through the jet projectile according to this invention.
Figure 2:
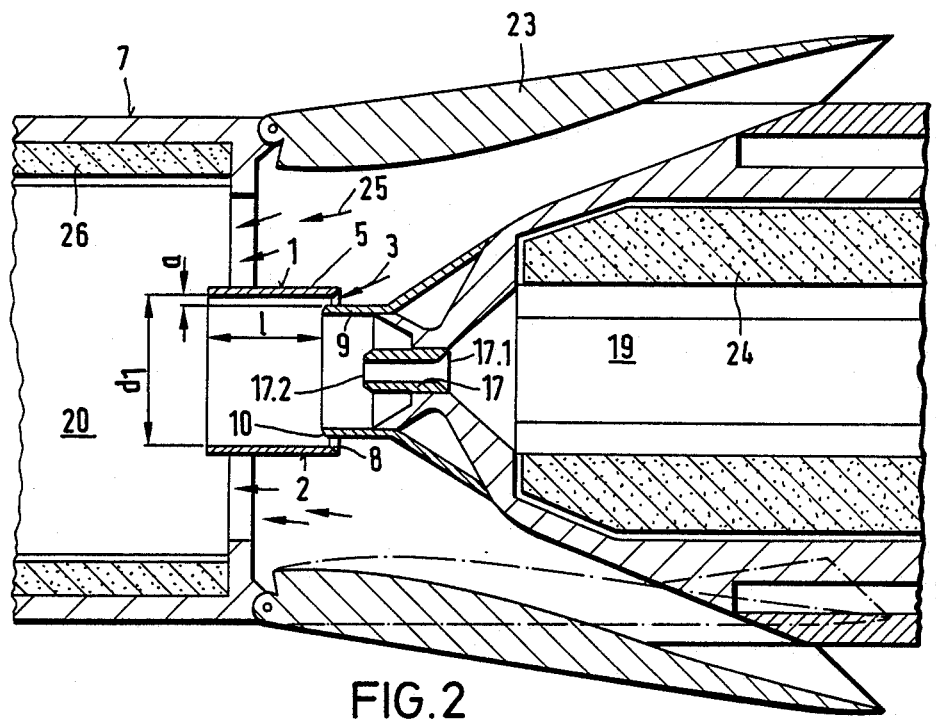
FIG. 2 is a large-scale view of a detail of FIG. 1.

As seen in FIGS. 1 and 2 a rocket according to this invention has a body 7 carrying on its front end a head 21 that can include an explosive charge as well as fusing and steering equipment. The body 7 extends along and is centered on an axis A and has a front part formed with a combustion chamber 19 lined with a body 24 of solid fuel. The middle of the body 7 forms a rear combustion chamber 20 lined with a body 26 of solid fuel. At its rear end 6 the body 7 carries deployable vanes or fins 22 that serve to stabilize and guide it when in flight, and immediately behind the warhead 21 are similarly deployable vanes or scoops 23 that admit air to the body 7, although it is also possible to form an axial passage through the head 21 to achieve this purpose. Such a rocket can be fired from a tube or gun or can be released from an airplane wing mount.

The gases generated in the chamber 19 by combustion of the lining 24 exit this chamber 19 axially at a mainly cylindrical small-diameter nozzle 17 having a front intake end 17.1 and a rear output end 17.2. This nozzle is centered on the axis A and forms an axially rearwardly expanding jet whose outline is indicated at 18.

According to this invention as seen in FIG. 2 an injector 1 is provided axially in back of this nozzle 17. This injector 1 has a rearwardly flaring frustoconical portion 2 extending out from the nozzle 17 between its ends 17.1 and 17.2 and joining at its rear end a front tube 9 having a downstream end 11 that is beveled from the outside. A larger-diameter tube 5 coaxial with the tube 9 has an upstream end 8 axially ahead of the beveled rear end 10 of the tube 9 and formed with an opposite inside bevel complementary to the beveled end 10. The upstream end of the outer downstream tube 5 is spaced out from the downstream end of the inner upstream tube 9 to form an annular gap or passage 3 into which a portion of the air deflected by the vanes 23 into the rocket enters, the balance passing around the injector 1 as shown by arrows 25. This gap 3 has a radial dimension a which bears a relationship to the diameter $d_i$ of the tube 5 such that the stoichiometric requirements of the combustion are perfectly met. The downstream end 10 of the inner tube 9 is located relative to the downstream end 17.2 of the nozzle 17, a distance h downstream therefrom, from which end 17.2 a fan-shaped jet 18 expandedly exits (FIG. 3).

Such an injector greatly increases the combustion efficiency of the generator gas emitted by the nozzle 17. The combustion gas produced by the partial destruction of the fuel 24 inside the primary chamber 19 is emitted under pressure by the nozzle 17 as the jet 18 exits therefrom and mixes rapidly and completely with the air entering via the axial intake passage 3. Even when the fuel 24 includes a 10% aluminum additive the ratio mA/mG of air admitted via the opening 3 to gas from the nozzle 17 will be more than 2.5:1 and less than 4.2:1, preferably around the ideal of mA/mG=4 at an ideal temperature of 2450° K., above the melting temperature of 2300° of alumina. With good combustion characteristics it is possible to use a relatively short length 1 with a small diameter $d_i$ for the region in the injector 1 where the air and generator gas mix, so that the burning generator gas on leaving the tube 5 mixes with the remaining air stream 25 and burns the fuel 26 in the chamber 20, creating substantial thrust out the stern 6.

FIG. 3 shows an arrangement wherein the rear tube 5 has a rear part 11 of a relatively small diameter $d_2$ generally corresponding to that of the front tube 9, and joined to the tube 5 by a frustoconical intermediate part 8.1 having the same angle b as the beveled ends 8 and 10. In FIG. 4 the tube 5 is of the diameter d2 and has a frustoconically flared front part 5.1 extending at the angle b and formed with an externally beveled front end 12.

In FIG. 5 the tube 5 has a rearward extension 11 of relatively small diameter internal diameter and is formed internally with a frustoconical shoulder 8.1. In addition as shown in FIG. 7 the two tubes 5 and 9 are joined together by radial struts fitting in slots 14 in the outer tube 5 and welded to the inner tube 9.

The system of FIG. 6 is substantially identical to that of FIG. 5 except that the outer tube 5 is secured by a screwthread 16 to the rear part 11. Four pegs 13 are shown in FIG. 8 securing the two together. Although a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

I claim:

1. A rocket engine comprising:
   a body generally extending along an axis and for moving through the air in a predetermined axial back-to-front direction, the body being formed with axially spaced front and rear fuel-containing combustion chambers;
   a nozzle on the axis, extending axially backward in the body from the front chamber, and having a rear nozzle end directed axially backward, gases are generated in the front chamber by combustion of the fuel therein and form a fan-shaped jet which has an extreme upstream end exiting from the rear nozzle end of said nozzle and which extends axially backward from said rear nozzle end;

a front tube having a cylindrical rear part and a radially inwardly tapered frusto-conical front part centered on the axis and surrounding the rear nozzle end, said frusto-conical front part having an upstream end sealingly coaxially mounted on the nozzle upstream of the rear nozzle end, said cylindrical rear part being formed with a radially inwardly directed bevel and located axially downstream of the upstream end of the jet formed by the nozzle;

a rear tube secured to and coaxial with the front tube, at least a portion of said rear tube radially surrounding said front tube and forming therewith an annular gap open axially upstream, and having an upstream end formed with a radially inwardly directed bevel which upstream end is positioned axially forward of the rear end of the cylindrical rear part of said front tube and means on the body for deflecting outside air axially back into the annular gap; said annular gap having a radial height "a" which is selected relative to the diameter "d", of the rear tube such that the stoichiometric combustion requirements of the rocket engine are satisfied.

2. The rocket engine defined in claim 1 wherein the rear tube includes a cylindrical front part forming the front end, a cylindrical rear part of the same general diameter as the front tube and axially therebehind, and a frustoconical intermediate part joining the front and rear parts.

3. The rocket engine defined in claim 1 wherein the bevels extend at an angle of between 3° and 45° to the axis.

4. The rocket engine defined in claim 1 wherein the rear tube has a frustoconical front part extending generally parallel to the outside bevel of the rear nozzle end and a cylindrical rear part joined to the front part and of generally the same diameter as the front tube.

5. The rocket engine defined in claim 1, further comprising
a plurality of radial struts fixedly bridging the gap and fixedly interconnecting the front and rear tubes.

6. The rocket engine defined in claim 5 wherein the rear tube is formed with slots in which the struts are seated.

7. The rocket engine defined in claim 1 wherein the rear tube is generally cylindrical and has a front part formed with a large-diameter cylindrical inner surface, a rear part formed with a small-diameter cylindrical inner surface, and a frustoconical intermediate part interconnecting the front and rear parts.

8. The rocket engine defined in claim 7 wherein the front, rear, and intermediate parts of the rear tube are unitary.

9. The rocket engine defined in claim 7 wherein the front part is threaded on the rear and intermediate parts.

10. The rocket engine defined in claim 1 wherein the tubes are of a metal having a melting point above 2500° K.

11. The rocket engine defined in claim 10 wherein the tubes are made of tungsten, of molybdenum, or of an alloy of tungsten and molybdenum.

12. The rocket engine defined in claim 1 wherein the bevel of the front end is an inside bevel.

13. The rocket engine defined in claim 1 wherein the bevel of the front end is an outside bevel.

* * * * *